(12) United States Patent
Nguyen et al.

(10) Patent No.: US 12,335,716 B2
(45) Date of Patent: Jun. 17, 2025

(54) ULTRASONIC MESSAGING IN MIXED REALITY

(71) Applicant: WARNER BROS. ENTERTAINMENT INC., Burbank, CA (US)

(72) Inventors: Ha Nguyen, Fullerton, CA (US); Masatoshi Chang-Ogimoto, New York, NY (US)

(73) Assignee: Warner Bros. Entertainment Inc., Burbank, CA (US)

( * ) Notice: Subject to any disclaimer, the term of this patent is extended or adjusted under 35 U.S.C. 154(b) by 874 days.

(21) Appl. No.: 17/233,437

(22) Filed: Apr. 17, 2021

(65) Prior Publication Data
US 2021/0314722 A1 Oct. 7, 2021

Related U.S. Application Data

(63) Continuation of application No. PCT/US2019/056833, filed on Oct. 17, 2019.

(60) Provisional application No. 62/747,637, filed on Oct. 18, 2018.

(51) Int. Cl.
| | |
|---|---|
| *H04S 7/00* | (2006.01) |
| *H04B 11/00* | (2006.01) |
| *G06T 19/00* | (2011.01) |

(52) U.S. Cl.
CPC .............. *H04S 7/303* (2013.01); *H04B 11/00* (2013.01); *G06T 19/006* (2013.01); *H04S 2400/11* (2013.01)

(58) Field of Classification Search
CPC ........ H04S 7/303; H04S 7/00; H04S 2400/11; H04B 11/00; G06T 19/006; G06T 7/00; G06T 19/00
See application file for complete search history.

(56) References Cited

U.S. PATENT DOCUMENTS

| | | | |
|---|---|---|---|
| 10,057,421 B1 * | 8/2018 | Chiu | H04L 65/762 |
| 2013/0335447 A1 | 12/2013 | Lu et al. | |
| 2014/0075040 A1 | 3/2014 | Chai et al. | |
| 2016/0135001 A1 | 5/2016 | Kao | |
| 2019/0130647 A1 * | 5/2019 | Qin | G06F 3/0484 |
| 2019/0355229 A1 * | 11/2019 | Chavez | G08B 1/08 |
| 2020/0082816 A1 * | 3/2020 | Mahajan | G10L 15/30 |

FOREIGN PATENT DOCUMENTS

| | | |
|---|---|---|
| KR | 10-2016-0124985 A | 10/2016 |
| WO | WO 2013/166158 A1 | 11/2013 |

OTHER PUBLICATIONS

WO, PCT/US2019/056833 ISR and Written Opinion, May 7, 2020.

* cited by examiner

*Primary Examiner* — Huyen X Vo
(74) *Attorney, Agent, or Firm* — Bookoff McAndrews, PLLC

(57) ABSTRACT

A method for receiving and processing sonic messaging by a mixed reality (xR) device from acoustic output of a media player playing content for a two-dimensional (2D) screen or projection surface, to coordinate the rendering and playing of an xR output in the xR device with the playing of the 2D content at the media player.

20 Claims, 7 Drawing Sheets

ULTRASONIC MESSAGING IN MIXED REALITY

CROSS-REFERENCE TO RELATED APPLICATION

The present application is a continuation of international (PCT) application Serial No. PCT/US2019/056833 filed Oct. 17, 2019, which claims priority under 35 U.S.C. § 119(e) to U.S. provisional application Ser. No. 62/747,637 filed Oct. 18, 2018, which applications are incorporated herein by reference in their entireties.

FIELD

The present application relates to digital image processing, and more particularly to systems or methods for embedding and communicating ultrasonic or human-inaudible sonic messages to coordinate mixed reality presentation with audio content from one or more sources local to a mixed reality device outputting the mixed reality presentation.

BACKGROUND

Mixed reality (xR) devices, including augmented reality (AR) devices and virtual reality (VR) devices, which may be collectively referred to herein as xR devices, for example Hololens™ by Microsoft Corporation, can present augmented or virtual reality based on various programmable cues. Applications for such devices include xR educational or entertainment content that is coordinated to audio-video content output on a display screen. For example, an AR device can make characters or objects from a movie or video game appear elsewhere than the display screen in the field of view of a user viewing the AR content. Coordination between AR output and output of entertainment content by an independent media player may require wireless signaling between an xR device and the media player. For many applications, e.g., home use or transitory use elsewhere, wireless radio signaling to an AR device may be limited or impossible because many users will not have the special players required to communicate with the AR device.

It would be desirable, therefore, to provide new methods and other new technologies able to coordinate an xR presentation with a traditional audio-video presentation without requiring a special media player or xR device for the traditional content that overcomes these and other limitations of the prior art.

SUMMARY

This summary and the following detailed description should be interpreted as complementary parts of an integrated disclosure, which parts may include redundant subject matter and/or supplemental subject matter. An omission in either section does not indicate priority or relative importance of any element described in the integrated application. Differences between the sections may include supplemental disclosures of alternative embodiments, additional details, or alternative descriptions of identical embodiments using different terminology, as should be apparent from the respective disclosures.

In an aspect of the disclosure, a method for receiving and processing sonic messaging by a mixed reality (xR) device may include detecting a digital pattern originating from acoustic output of a media player playing content for a two-dimensional (2D) screen or projection surface, based on matching the digital pattern to an identifier, for example a characteristic pattern of binary digits held in a memory of the xR device. In an aspect, the acoustic output is generated by the media player from a digital audio stream and captured by a microphone of the xR device, which converts the audio output to digital data. The acoustic output may be human-inaudible, for example, ultrasonic or subliminal. In another aspect, the identifier may be one of many unique identifiers each associated by a data structure to an xR output control message in a memory of, or coupled to, the xR device to an xR input and/or a link to other xR input data. The data structure may be downloaded to the xR device at run time. Each identifier may indicate, for example by application of the data structure, the xR output control message including one or more of new input data for output by the xR device, an alteration in the input data, command input, a variable for an xR rendering engine, or a link to any of the foregoing. As used herein, a "link" may include a hyperlink in any useful markup language, a computer memory pointer, a database address, an index location, or other digital object enabling access by the player device to the linked information.

The method further may include determining and outputting an audio or video output for the xR device, based on the identifier. The method may further include identifying of the media player playing the acoustic output and detecting the identifier in a digital audio stream that includes a digitization of other sound emitted by the media player. The method may also include identifying a location of the player device, then coordinating the audio or video output for the xR device with a second audio-video content output by the player device based on the second audio-video content or the location of the player device. The media player device may be, or may include, a disc media player, a smart phone, a tablet computer, a smart TV, a personal computer, a cinema projection device, an audio player in a home theater system or cinematic system, an IoT speaker system (e.g., Amazon™ Alexa™) or any other player device for receiving a digital input and creating audio output synchronized to a display of 2D or three-dimensional (3D or stereographic) video content on a 2D surface. Optionally, the method may include decoding a text message based on the identifier, and interpreting the text message. For example, the text message may be, or may be included in, the xR output control message.

In another aspect of the disclosure, a method for providing sonic messaging for use in controlling mixed reality (xR) may include identifying an output control message for xR, an original audio track for an audio-video work and a specified location in the original audio track for insertion of an encoded message. The output control message may be encoded in a digital audio format in ultrasonic frequencies, at a human-inaudible but machine-detectable volume or other subliminal pattern, resulting in an encoded message. The method may further include preparing a modified audio track for the audio-video work that includes the encoded message, by inserting the encoded message into the original audio track at the specified location and recording the modified audio track for playing with a video portion of the audio-video work during an xR session. The method may further include receiving the output control message, an identification of the original audio track and the specified location from an external source, for example, a computer terminal, server, computer memory or database, electronic message, or other input.

The methods described herein provide an automated process for embedding sonic messaging in an audio track for traditional audio-video content. Applications for the methods may include, for example, using sonic messaging to communicate time, spatial position, and relevant content information from a media player to xR devices so that these devices can render digital content in specified time and space to extend and enhance the media viewing experience. Advantages of the method include compatibility with virtually every media player and xR device without requiring additional or special hardware, and the ability to configure the data structure that determines the effect of the xR output control message at runtime or anytime before.

In an aspect of the disclosure, a system and apparatus for sonic messaging in mixed reality (xR) may include a media player that receives an encoded audio-video signal and outputs audio-video output based on the encoded audio-video signal. The encoded audio-video signal may include at least one human-inaudible encoded output control message for controlling xR output. The system and apparatus further may include an xR device that detects the encoded output control message and controls video or audio output of the xR device based on the encoded message.

The foregoing methods may be implemented in any suitable programmable computing apparatus, by provided program instructions in a non-transitory computer-readable medium that, when executed by a computer processor, cause the apparatus to perform the described operations. The computer processor (or "processor") may be local to the apparatus and user, located remotely, or may include a combination of local and remote processors. An apparatus may include a computer or set of connected computers that is used in audio-video production or for output of audio-video or xR content to one or more users. A media player for 2D screen content may include, for example, a streaming video receiver, a smart TV, a smart phone, a tablet computer, a personal computer, a home theater projector, or a cinematic projector. An xR device may include, for example, a personal computer, mobile phone, notepad computer, wearable headset, xR glasses, xR contact lenses, or other xR (virtual reality, augmented reality, or mixed reality) device. The xR device may be, or may include, a headset or other display that reacts to movements of a user's head, eyes and other body parts. Other elements of the apparatus may include, for example, an audio output device and a user input device, which participate in the execution of the method. The xR apparatus, the media player, or a connected device may include biometric sensors that provide data used by a controller to control details of the audio-video or xR content.

To the accomplishment of the foregoing and related ends, one or more examples comprise the features hereinafter fully described and particularly pointed out in the claims. The following description and the annexed drawings set forth in detail certain illustrative aspects and are indicative of but a few of the various ways in which the principles of the examples may be employed. Other advantages and novel features will become apparent from the following detailed description when considered in conjunction with the drawings and the disclosed examples, which encompass all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify like elements correspondingly throughout the specification and drawings.

DETAILED DESCRIPTION

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form to facilitate describing these aspects and novel combinations of elements.

Figure 1:
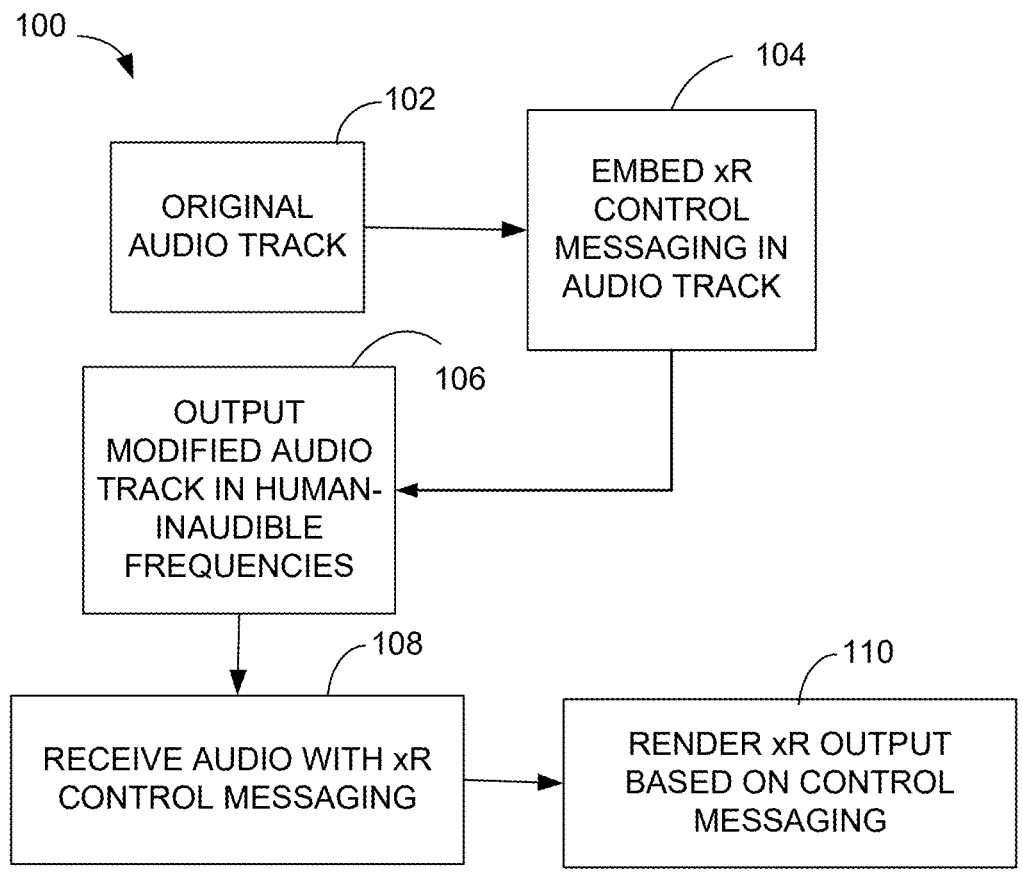
FIG. 1 is a schematic diagram illustrating an overview of using sonic messaging to coordinate an xR presentation with a local audio video presentation.

FIG. 1 shows an overview 100 of using sonic messaging to coordinate an xR presentation with audio-video or audio-only output by a media player independent of an xR device. The method 100 may be performed by one or more computer processors of the xR device, a server in electronic communication with the xR device, and/or an independent server not in electronic communication with the xR device. At the process 102, the one or more processors identify an audio track of an audio video work through a microphone or other audio sensor. The audio track may correspond to one or more portions of the audio-video work where an xR output at an xR device is desired while the audio video work is played on a 2D screen of a media player or on a projection surface. More particularly, xR content played by the xR device is configured to output content based on, and in response to, one or more human-imperceptible audio triggers embedded in the audio track. At computer process 104, a production server inserts (e.g., embeds) an xR control message into the audio track at a specified location in the audio track. The location may be specified in a data structure prepared by a human or robotic content editor. In an aspect of the present disclosure, the production server embeds the xR control message in the audio track at an audio frequency inaudible or imperceptible to humans. In an aspect of the present disclosure, Processes 102-104 may be performed by one or more processors at a content production server. Further details of processes 102-104 are described in connection with FIG. 4 below.

The xR control message may include one or more of new input data for output by the xR device, an alteration in the input data, command input, one or more variables for an xR rendering engine, or a link to any of the foregoing. Any content distribution server or supply chain may transmit or otherwise provide the modified audio track to a media player as part the audio-video work, with or without any indication that the audio-video work is enabled for sonic messaging to xR devices. The media player receives and plays the audio video work on a 2D screen or a projection surface. At computer process 106, as the media player plays, or outputs the 2D audio video work, an audio output transducer coupled to the media player emits a human-imperceptible acoustic signal whenever the modified audio track contains the embedded control message, without requiring any special processing. Any conventional media player should be able to convert the digital audio track to an electronic signal for driving an audio system in one or more channels (e.g., mono, stereo, 5-channel surround, etc.), causing the audio system to emit the human-imperceptible acoustic signal. When the xR device detects the acoustic signal, it interprets the signal to discover the embedded control message.

In alternative embodiments, the media player may detect the audio track with the xR control message and emit the xR control message in an audio frequency or format inaudible to humans based on data and instructions in its memory. For example, a processor of the xR device may apply a filter to audio captured at a microphone input or other audio input to detect ultrasonic or subliminal sound patterns from the 2D media player. The alternative embodiments require special configuring of the media player and thus may not be optimal for use cases in which the audio-video content can be player by any conventional player device. Where an ultrasonic signal is used, the audio transducer of the media player should be able to emit tones at the desired ultrasonic frequency or frequencies, for example, tones at any frequency in a range of about 16 KHz to 22 Khz, 18 KHz to 20 KHz, or 20 KHz to 22 KHz. In addition, the microphone of the xR device should be sensitive to frequencies in the emitted ultrasonic range. For any given frequency, the media player should emit the tone at a high enough volume to serve as a signal to the xR device and a low enough volume to be inaudible to most humans.

At computer process 108, an xR device receives the xR control message emitted by the media player. In an aspect of the present disclosure, the xR device may receive the xR control message using a microphone and convert the received signal to digital data. From the digital data, the xR device may detect an identifier in the xR control message. Based on the identifier, the xR device may detect a digital pattern in the xR control message, and match the digital pattern to, for example, a characteristic pattern of binary digits held in a memory of the xR device. Each identifier may be, for example a code or an address. Based on the identifier, the xR device may look up further instructions and/or xR content data in a pre-defined data structure. The data structure may be part of an xR entertainment package, for example, an entertainment 'title' prepared for xR devices of a given type. Thus, the xR device may configure itself to receive the control messages conveyed by the human-imperceptible acoustic signals by loading the title into its memory at runtime. In an aspect, the data structure may include one or more of new input data for output by the xR device, an alteration in the input data, command input, one or more variables for an xR rendering engine, or a link to any of the foregoing. At computer process 110, based on information in the data structure and data from memory, the xR device renders and outputs xR content corresponding to 2D presentation being outputted at the media player. Processes 108-110 may be performed by one or more processors at the xR device. Further details of processes 108-110 are described in connection with FIG. 5 below.

In another aspect of the present disclosure, the xR control message may be embedded in the xR control message in a subliminal mode, instead of for transmission at a human-inaudible frequency (e.g., ultrasonic) or volume. A subliminal message may be above the human threshold of hearing but formatted in a way that a human listener will not perceive it as conveying a control message. For example, it might be formatted by a production server as a tone sequence or beat in a sub-track of music that seems to be a part of a musical composition or sound effect. The production server may distribute the sequence in the audio track in a pattern that only a properly configured audio analysis component can recognize carries message data. As with ultrasonic tone, the xR device may detect the subliminal audio messages by applying a filter to an audio stream from microphone input or other audio input.

As used herein, "subliminal" means "not consciously perceived" despite being within an audible frequency and volume range. Subliminal audio may be engineered using masking effects in which perceived audio obscures perception of part of the audio signal that carries the control message for xR, for example, by exploiting uneven human hearing sensitivity across different frequency bands. For example, a media player may emit the subliminal control signal concurrently with more easily perceived audible audio that masks the subliminal signal. Thus, subliminal audio may be driven by an input audio track that synchronizes both the subliminal signal and masking audio to desired xR control input. To assist synchronization and avoid aesthetic degradation of the soundtrack, the subliminal signal may include delay information. For example, suppose a script calls for a large crash followed by dead silence for ten seconds, after which the xR device should show a ghostly character emerge from a nearby wall. In this scenario, the subliminal message may be masked by the loud crash, and instruct the xR device to wait ten seconds (or any other desired time period) before outputting the desired special xR effect.

Figure 2:
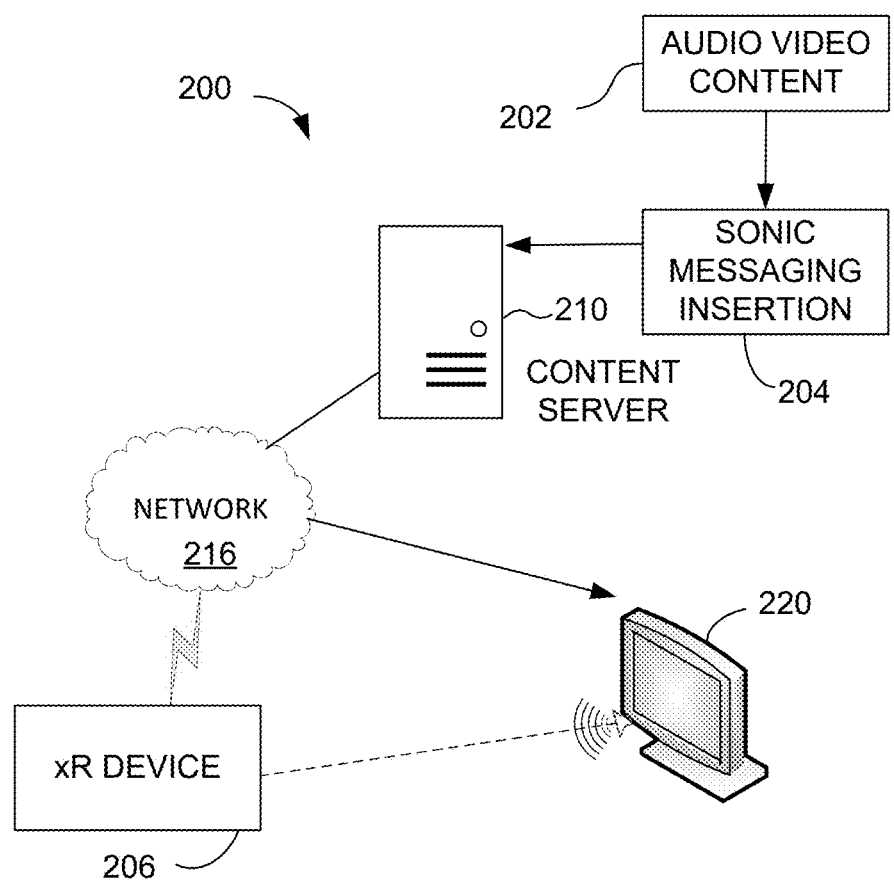
FIG. 2 is a block diagram illustrating an example of a computer network in which the novel methods and apparatus of the application may find use.

FIG. 2 shows a computer network 200 in which the novel methods and apparatus of the application may find use. One or more content servers 210 (e.g., a server farm or cloud) interconnected through a local area network, wide area network 216, or other network may execute the processes and algorithms described herein, producing digital audio-video and xR control messages that may be stored and distributed. In some embodiments, analog (e.g., film) content 202 may be converted to digital form using any suitable conversion process, for example, digital scanning. A production server may insert sonic messaging 204 into the audio-video content. One or more distribution servers may provide content for processing or delivery to consumers to a variety of clients from the content server 202 through the network 216, e.g., the Internet or cellular telephone and data networks, and one or more router/modems/hotspots. Clients 220 for playing the audio-video content may include, for example, smart phones, personal computers, notepad devices, projectors, capable of emitting high-frequency/ultrasonic tones. Clients for playing xR content may include, for example, wearable xR devices 206. The audio-video may be transcoded to a suitable format for the destination device 220 prior to delivery.

The audio-video output device plays the received content as received, emitting the ultrasonic signaling tones inserted at 204. The client xR device 206 receives the ultrasonic tones with a microphone and optionally an analog-to-digital converter that outputs a digital audio signal. The device 206 then recognizes the tones using a signal processor, which may be, or may include, a software component. The signal processor generates an electronic (e.g., digital) command signal responsive to the audio signal. A content player component of the client xR device may play responsive xR content configured to output specified content or otherwise respond to digital commands from the signal processor. The client xR device 206 may receive responsive xR content from any suitable source, for example, content server 210 via the network 216. Advantageously, the xR content may be capable of operation with or without ultrasonic signaling input, which when present enhances the user experience. In an alternative, the xR content may be configured to be inoperative without ultrasonic signaling.

Figure 3:
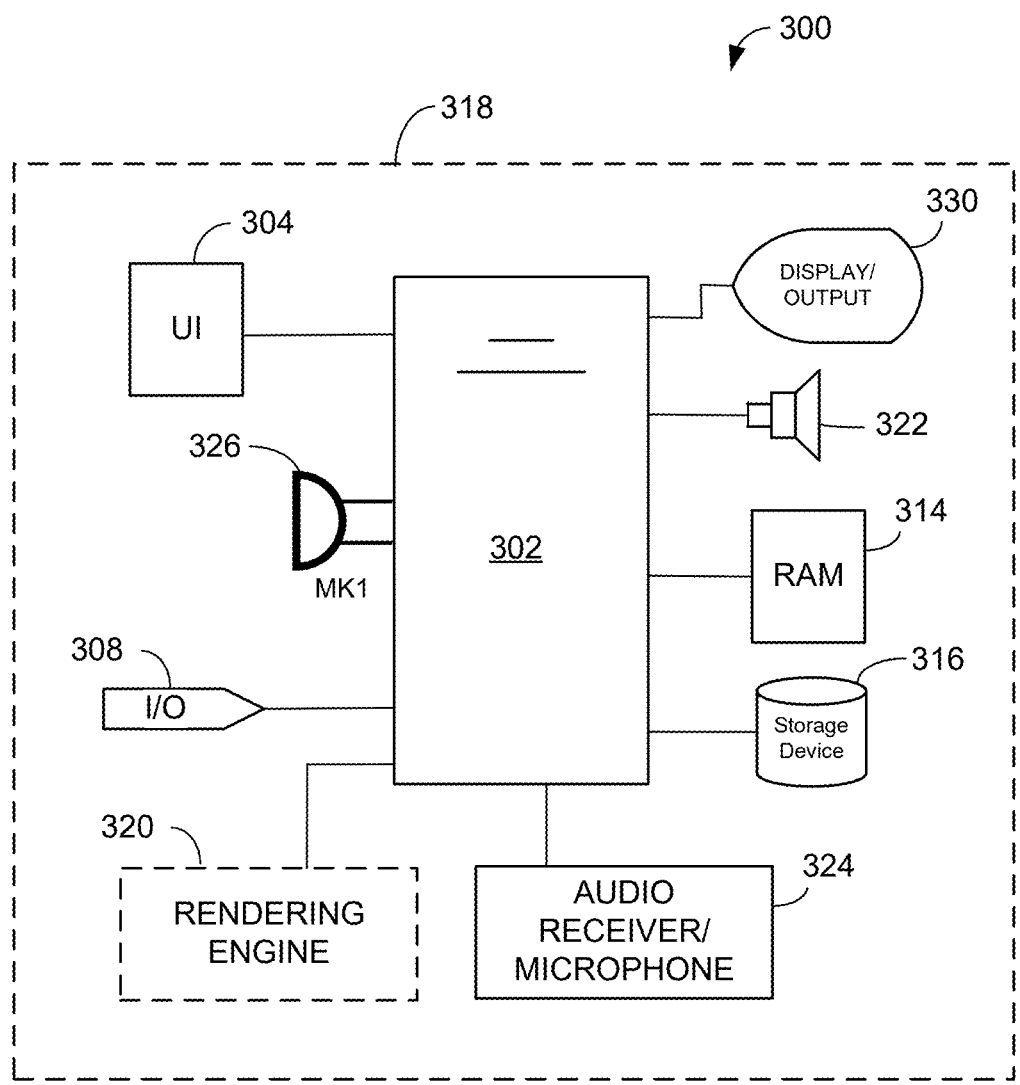
FIG. 3 is a schematic diagram illustrating a system or apparatus for performing operations of the present methods.

Referring to FIG. 3, an exemplary processor 318 of an apparatus 300, for example a content server, an xR device or a media player, is shown. A processor 318 may include a CPU 302 and random-access memory (RAM) 314 holding program instructions and data for execution and processing by the processor 318. When the apparatus 300 is powered off or in an inactive state, program instructions and data may be stored in a long-term memory, for example, a non-volatile magnetic, optical, or electronic memory storage device 316. Either or both of the RAM 314 or the storage device 316 may comprise a non-transitory computer-readable medium holding program instructions, that when executed by the CPU 302, cause the processor 318 and apparatus 300 to perform a method or operations as described herein. Program instructions may be written in any suitable high-level language, for example, C, C++, C#, or Java™, and compiled to produce machine-language code for execution by the processor. Program instructions may be grouped into functional modules, to facilitate coding efficiency and comprehensibility. It should be appreciated that such modules, even if discernable as divisions or grouping in source code, are not necessarily distinguishable as separate code blocks in machine-level coding. Code bundles directed toward a specific function may be considered to comprise a module, regardless of whether machine code in the bundle can be executed independently of other machine code. The apparatus 300 may also include a rendering engine 320 to render 2D or 3D output. Other components of the apparatus 300 may include, for example, a display output 330, audio transducer 322, an input/output port 308 for connecting to an network, an audio receiver 324, for example a microphone 326, and a user interface device 304 for receiving user input, for example, a touchpad, touchscreen, motion-sensitive controller, keypad, or other user input device.

Figure 4:
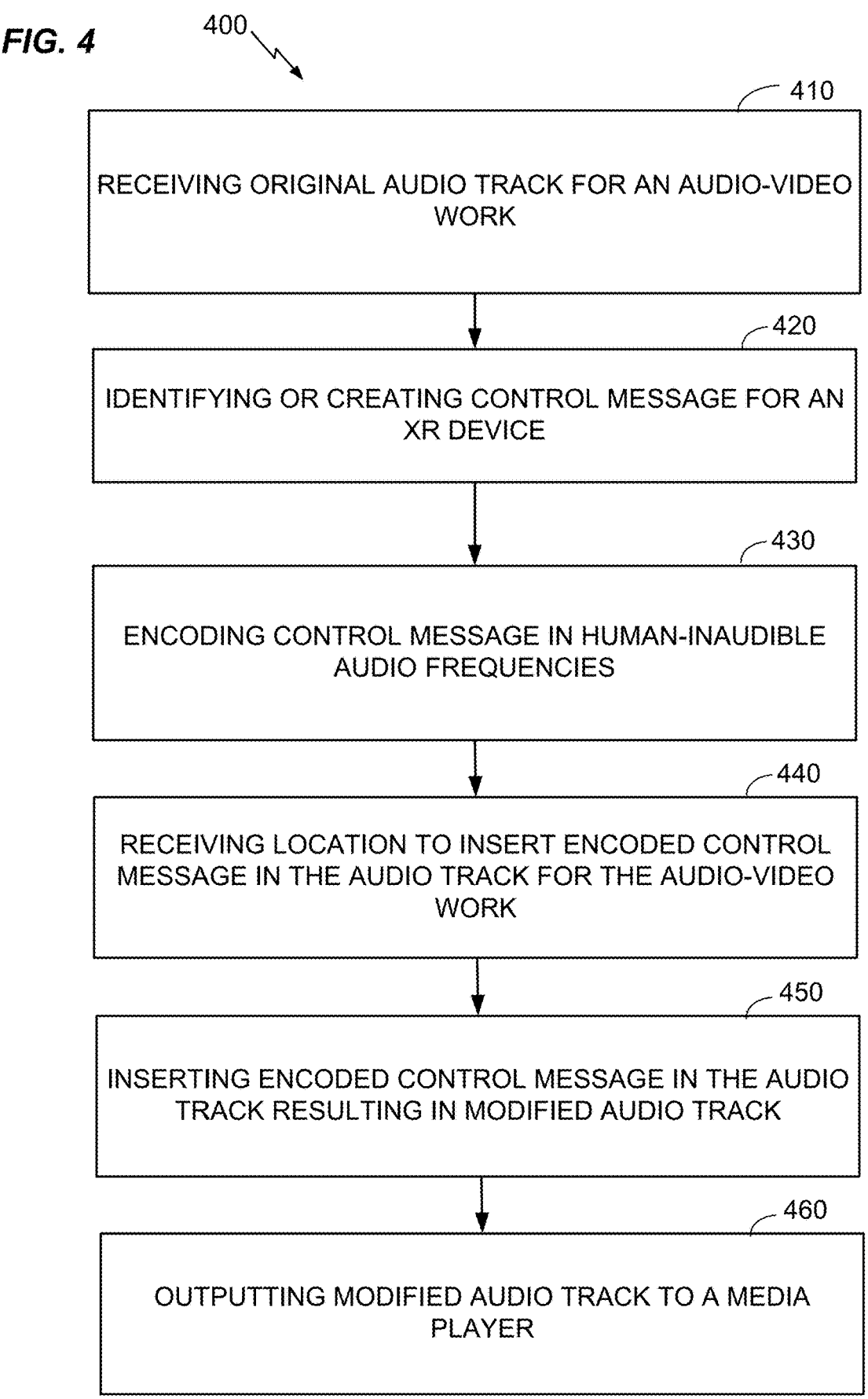
FIG. 4 is a flow diagram illustrating a process for embedding a control message in an audio track for transmitting to a media player.

FIG. 4 diagrams a useful automatic process 400 for embedding a control message in an audio track and transmission to a media player to coordinate the playing of an xR output with the presentation of a 2D presentation of an audio video work. In an aspect of the present disclosure, the process 400 may be performed by one or more processors at a content server. At 410, a processor receives an audio track corresponding to the audio video work. The audio track corresponds specifically to a portion of the audio video work where an xR output at an xR device is desired while the audio video is played on a 2D screen of a media player or on a projection surface. The audio track may be sent to the processor from another process or may be retrieved from a data storage at the content server.

At 420, in an aspect, the processor identifies a pre-defined xR control message which may be used to coordinate the playing of an xR output with the presentation of a 2D presentation of the audio video work. In another aspect, the processor may create the xR control message based on information received or retrieved in conjunction with the receiving or retrieving of the audio track.

At 430, the processor may encode the xR control message into the audio track, resulting in a modified audio track. In an aspect, the processor encodes the xR control message so that it can be emitted from a media player in a human inaudible frequency, for example, a frequency not less than 18 KHz. In an alternative, the processor encodes control message for emission in a subliminal mode. At 440, the processor also receives or retrieves information indicating the location or position within the audio track to insert or embed the encoded xR control message at 450. In another aspect, this information may be part of receiving and retrieving the xR control message at 420 above. At 460, the processor transmits the modified audio track with the encoded xR control message to one or more media players.

As the modified audio track with the encoded xR control message will be emitted from the media player in coordination with a 2D presentation of a portion of the audio video work, the information received or retrieved at 440 may also specify a time relative to the portion of the audio video work. In an aspect, the information may specify that the encoded xR control message be inserted into the audio track such that it will be emitted to an xR device at a specified time before the portion of the audio video work is presented at the media player. As an example, an xR control message can be used to coordinate between a media player and an xR device such that in an audio video work when a certain corresponding 2D scene is presented at the media player, an xR object is outputted at the xR device. Thus, the viewer of the xR device sees both the 2D presentation and output of the xR device, including a view of the xR object as if placed in the 2D presentation. For example, the xR user may see an xR rendered person appearing in the 2D presentation which, to someone viewing without xR, lacks any appearance of the rendered person. In this example, the xR control message may be inserted into the audio track such that the xR control message will be emitted by the media player at a certain time, for example 5 seconds, before the corresponding 2D portion of the audio video is presented at the media player. The 5 seconds example (or any other determined time) may equate to the time needed to emit the xR control message, for the xR control message to be received by an xR device, and for the necessary processing to render an xR output and display it at the xR device.

Figure 5:
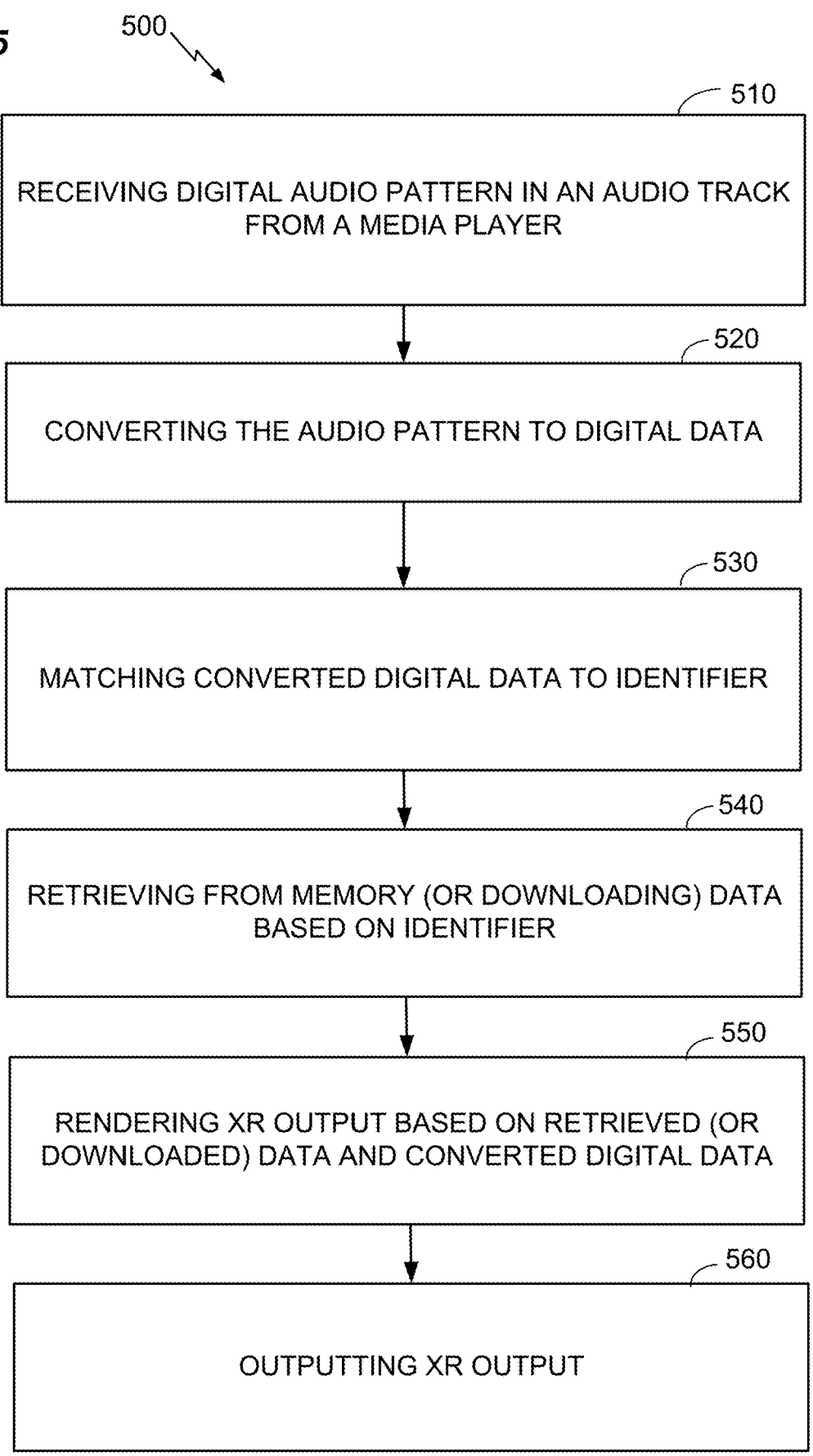
FIG. 5 is a flow diagram illustrating a process for receiving and processing an xR control message in an audio track to coordinate the playing of an xR output with the presentation of a 2D presentation of an audio video work.

Referring to FIG. 5, a diagram of a useful automatic process 500 is shown for receiving and processing an xR control message in an audio track to coordinate the playing of an xR output with the presentation of a 2D presentation of an audio video work. In an aspect of the present disclosure, the process 500 may be performed by one or more processors at an xR device. At 510, a processor receives an audio track corresponding to a portion of an audio video work being presented at a media player. The audio track may be received by a microphone of the xR device. The audio track may be emitted and received in a human inaudible frequency. The audio track includes an xR control message in analog form representing a predetermined digital pattern, for example a predetermined frame or message structure. At 520, an analog-to-digital converter converts the analog signal to digital data representing an xR control message. In an aspect, the xR control message may include an identifier. At 530, the processor matches or looks up the identifier based on a predetermined pattern or structure of the xR control message. In an aspect, the identifier may be a series of bits of a predetermined length. The processor retrieves the bits and convert them to a predetermined alphanumeric string representing the identifier. In an aspect, the processor may look up the identifier using a parser. In another aspect, at 540, the processor may interpret the identifier as a name of a code (e.g., a function, routine or module) located in a memory or storage of the xR device, which may be used to render an xR output. In an aspect, the processor may interpret the identifier as an index into a look-up table, a library, or the like, with addresses or pointers to the codes (e.g., functions, routines or modules), or a link to any of the foregoing. As a result, based on the identifier, the processor can retrieve the necessary codes.

In an aspect, the xR control message also includes other data and information needed for rendering an xR output at the xR device, where the xR output corresponds to a specific portion of the audio video presentation being outputted at the media player. The information may include 3D rendering variables such as shape, color, lighting, depth, etc. At 550, the processor may invoke the code indicated at 540 to render an xR output using the data and information from the xR control message. In an aspect, the code may be part of a rendering engine. At 560, the processor outputs the xR output at the xR device. As a result, the viewer of the xR device sees the xR output together with the corresponding 2D presentation on the media player.

In another aspect of the present disclosure, the xR device may also receive information indicating the location or position of the media player in relation to the location or position of the xR device. This information may be used in rendering the xR output. For example, there may be two xR devices each receives its own xR control message with the location or position of the same media player, but relative to each xR device. Each xR device, using the location or position information, renders its xR output such that the viewer of each xR device will see the xR output in the same location or position in the 2D presentation.

Figure 6:
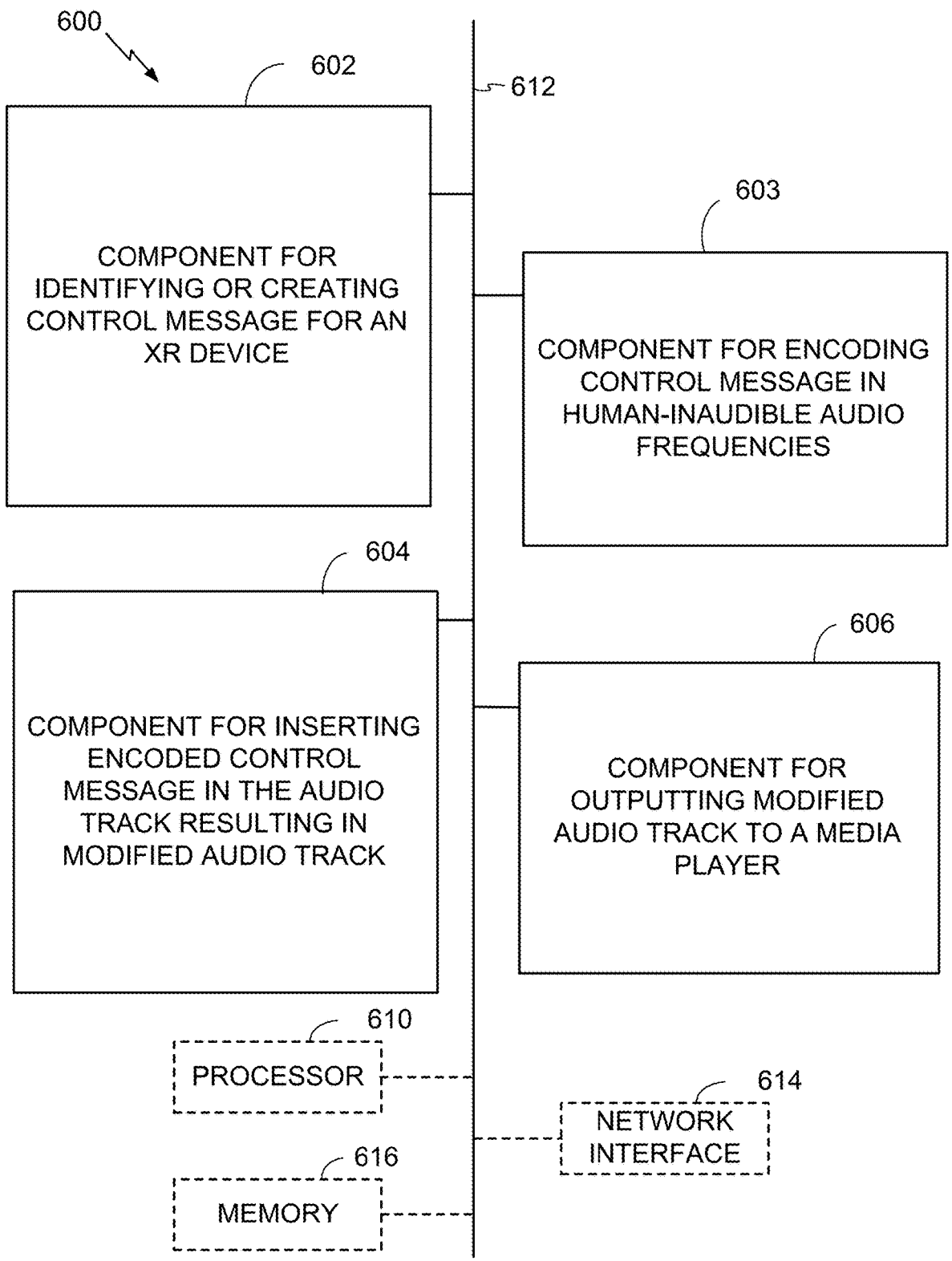
FIG. 6 conceptual block diagram illustrating components of an apparatus or system for the method as shown in FIG. 4.

FIG. 6 is a conceptual block diagram illustrating components of an apparatus or system 600 for embedding a control message in an audio track and transmit to a media player to coordinate the playing of an xR output with the presentation of a 2D presentation of an audio video work as described herein, according to one embodiment. As depicted, the apparatus or system 600 may include functional blocks that can represent functions implemented by a processor, software, or combination thereof (e.g., firmware).

As illustrated in FIG. 6, the apparatus or system 600 may comprise an electrical component 602 for identifying a pre-defined xR control message which may be used to coordinate the playing of an xR output with the presentation of a 2D presentation of an audio video work. The component 602 may be, or may include, a means for said identifying. Said means may include the processor 610 coupled to the memory 616, and to the network interface 614, the processor executing an algorithm based on program instructions stored in the memory. Such algorithm may include a sequence of more detailed operations, for example, as described in connection with blocks 410 and 420 of FIG. 4 above.

The apparatus or system 600 may further comprise an electrical component 603 for encoding the xR control message so that it can be emitted from a media player in a human inaudible frequency. The component 603 may be, or may include, a means for said encoding. Said means may include the processor 610 coupled to the memory 616, and to the network interface 614, the processor executing an algorithm based on program instructions stored in the memory. Such algorithm may include a sequence of more detailed operations, for example, as described in connection with block 430 of FIG. 4.

The apparatus or system 600 may further comprise an electrical component 604 for inserting the encoded xR control message in the audio track. The component 604 may be, or may include, a means for said insertion. Said means may include the processor 610 coupled to the memory 616, and to the network interface 614, the processor executing an algorithm based on program instructions stored in the memory. Such algorithm may include a sequence of more detailed operations, for example, as described in connection with blocks 440 and 450 of FIG. 4.

The apparatus or system 600 may further comprise an electrical component 606 for outputting the xR control message to a media player. The component 606 may be, or may include, a means for said outputting. Said means may include the processor 610 coupled to the memory 616, and to the network interface 614, the processor executing an algorithm based on program instructions stored in the memory. Such algorithm may include a sequence of more detailed operations, for example, as described in connection with block 460 of FIG. 4.

As shown, the apparatus or system 600 may include a processor component 610 having one or more processors, which may include a digital signal processor. The processor 610, in such case, may be in operative communication with the modules 602-606 via a bus 612 or other communication coupling, for example, a network. The processor 610 may initiate and schedule the functions performed by electrical components 602-606.

In related aspects, the apparatus 600 may include a network interface module 614 operable for communicating with a storage device, with media players, or other remote devices over a computer network. In further related aspects, the apparatus 600 may optionally include a module for storing information, such as, for example, a memory device/module 616. The computer readable medium or the memory module 616 may be operatively coupled to the other components of the apparatus 600 via the bus 612 or the like. The memory module 616 may be adapted to store computer readable instructions and data for effecting the processes and behavior of the modules 602-606, and subcomponents thereof, or the processor 610, or the method 400. The memory module 616 may retain instructions for executing functions associated with the modules 602-606. While shown as being external to the memory 616, it is to be understood that the modules 602-606 can exist within the memory 616.

Figure 7:
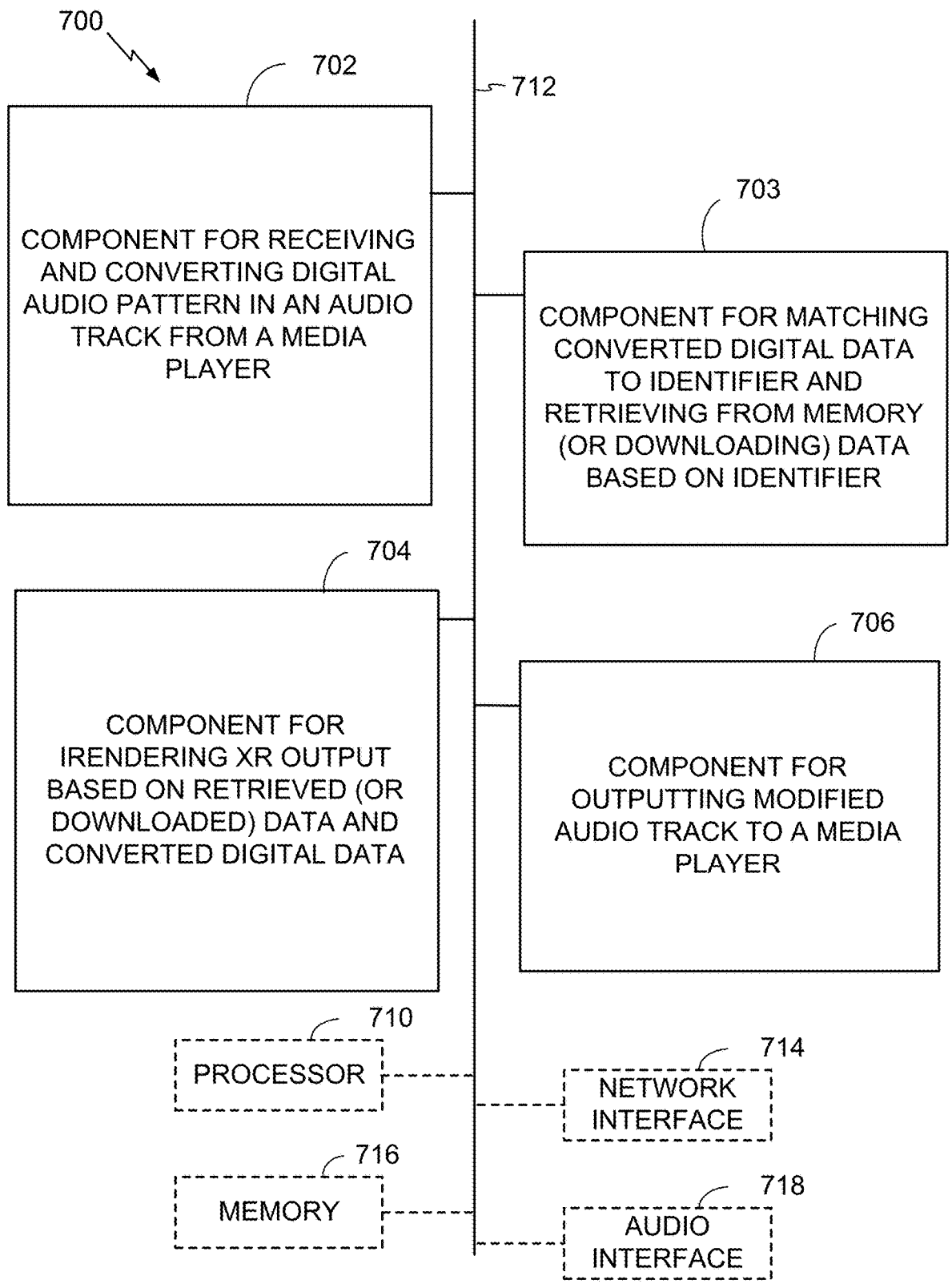
FIG. 7 conceptual block diagram illustrating components of an apparatus or system for the method as shown in FIG. 5.

FIG. 7 is a conceptual block diagram illustrating components of an apparatus or system 700 for rendering and outputting an xR output at an xR device in coordination with the presentation of a 2D presentation of an audio video work at a media player as described herein, according to one embodiment. As depicted, the apparatus or system 700 may include functional blocks that can represent functions implemented by a processor, software, or combination thereof (e.g., firmware).

As illustrated in FIG. 7, the apparatus or system 700 may comprise an electrical component 702 for receiving an audio track corresponding to a portion of an audio video work being presented at a media player, and converting the analog signal to digital data. The component 702 may be, or may include, a means for said receiving and converting. Said means may include the processor 710 coupled to the memory 716, an audio interface 718, and to the network interface 714, the processor executing an algorithm based on program instructions stored in the memory. Such algorithm may include a sequence of more detailed operations, for example, as described in connection with blocks 510-520 of FIG. 5 above.

The apparatus or system 700 may further comprise an electrical component 703 for matching the converted digital data to an identifier, and retrieving (or downloading) data based on the identifier. The data will be used in the component 704 described further below. The component 703 may be, or may include, a means for said matching and retrieving (or downloading). Said means may include the processor 710 coupled to the memory 716, an audio interface 718, and to the network interface 714, the processor executing an algorithm based on program instructions stored in the memory. Such algorithm may include a sequence of more detailed operations, for example, as described in connection with blocks 530-540 of FIG. 5.

The apparatus or system 700 may further comprise an electrical component 704 for rendering an xR output based on data retrieved (or downloaded) by the electrical component 703. The component 704 may be, or may include, a means for said rendering. Said means may include the processor 710 coupled to the memory 716, an audio interface 718, and to the network interface 714, the processor executing an algorithm based on program instructions stored in the memory. Such algorithm may include a sequence of more detailed operations, for example, as shown and described in connection with block 550 of FIG. 5.

The apparatus or system 700 may further comprise an electrical component 706 for outputting the xR output rendered by component 704 above. The component 706 may be, or may include, a means for said generating. Said means may include the processor 710 coupled to the memory 716, an audio interface 718, and to the network interface 714, the processor executing an algorithm based on program instructions stored in the memory. Such algorithm may include a sequence of more detailed operations, for example, as shown and described in connection with block 560 of FIG. 5.

As shown, the apparatus or system 700 may include a processor component 710 having one or more processors, in the case of the apparatus or system 700 may include a 3D rendering engine. The processor 710, in such case, may be in operative communication with the modules 702-706 via a bus 712 or other communication coupling, for example, a network. The processor 710 may initiate and schedule the functions performed by electrical components 702-706.

In related aspects, the apparatus or system 700 may include a network interface module 714 operable for communicating with a storage device over a computer network. In further related aspects, the apparatus or system 700 may optionally include a module for storing information, such as, for example, a memory device/module 716. The computer readable medium or the memory module 716 may be operatively coupled to the other components of the apparatus 700 via the bus 712 or the like. The memory module 716 may be adapted to store computer readable instructions and data for effecting the processes and behavior of the modules 702-706, and subcomponents thereof, or the processor 710, or the method 500. The memory module 716 may retain instructions for executing functions associated with the modules 702-706. While shown as being external to the memory 716, it is to be understood that the modules 702-706 can exist within the memory 716.

In further related aspects, the apparatus or system 700 may include an audio interface 718, such as, for example, a microphone interface for receiving signal from one or more media players, and other external devices. The audio interface 718 may be operatively coupled to the other components of the apparatus 700 via the bus 712 or the like.

Those of skill would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the application and design constraints imposed on the overall system. Skilled artisans may implement the described functionality in varying ways for each application, but such implementation decisions should not be interpreted as causing a departure from the scope of the present disclosure.

As used in this application, the terms "component", "module", "system", and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer or system of cooperating computers. By way of illustration, both an application running on a server and the server can be a component. One or more components may reside within a process and/or thread of execution and a component may be localized on one computer and/or distributed between two or more computers.

In the foregoing description and in the figures, like elements are identified with like reference numerals. The use of "e.g.," "etc.," and "or" indicates non-exclusive alternatives without limitation, unless otherwise noted. The use of "including" or "include" means "including, but not limited to," or "include, but not limited to," unless otherwise noted.

In many instances entities are described herein as being coupled to other entities. The terms "coupled" and "connected" (or any of their forms) are used interchangeably herein and, in both cases, are generic to the direct coupling of two entities without any non-negligible (e.g., parasitic) intervening entities and the indirect coupling of two entities (with one or more non-negligible intervening entities). Where entities are shown as being directly coupled together or described as coupled together without description of any intervening entity, it should be understood that those entities can be indirectly coupled together as well unless the context clearly dictates otherwise. The definitions of the words or drawing elements described herein are meant to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements described and its various embodiments or that a single element may be substituted for two or more elements in a claim.

Various aspects will be presented in terms of systems that may include several components, modules, and the like. It is to be understood and appreciated that the various systems may include additional components, modules, etc. and/or may not include all the components, modules, etc. discussed in connection with the figures. A combination of these approaches may also be used. The various aspects disclosed herein can be performed on electrical devices including devices that utilize touch screen display technologies and/or mouse-and-keyboard type interfaces. Examples of such devices include computers (desktop and mobile), smart phones, personal digital assistants (PDAs), and other electronic devices both wired and wireless.

In addition, the various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Operational aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

Furthermore, the one or more versions may be implemented as a method, apparatus, or article of manufacture using standard programming and/or engineering techniques to produce software, firmware, hardware, or any combination thereof to control a computer to implement the disclosed aspects. Non-transitory computer readable media can include but are not limited to magnetic storage devices (e.g., hard disk, floppy disk, magnetic strips . . . ), optical disks (e.g., compact disk (CD), digital versatile disk (DVD), BluRay™ . . . ), smart cards, solid-state devices (SSDs), and flash memory devices (e.g., card, stick). Of course, those skilled in the art will recognize many modifications may be made to this configuration without departing from the scope of the disclosed aspects.

The previous description of the disclosed aspects is provided to enable any person skilled in the art to make or use the present disclosure. Various modifications to these aspects will be clear to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described herein. Additionally, it should be further appreciated that the methodologies disclosed herein are capable of being stored on an article of manufacture to facilitate transporting and transferring such methodologies to computers.

The invention claimed is:

1. A computer-implemented method for receiving and processing sonic messaging by a mixed reality (xR) device, the method comprising:
   detecting, by one or more processors via a microphone of the xR device, an acoustic signal in a digital audio stream from an audio-video source, the acoustic signal including an embedded control message, wherein the embedded control message includes a location of the audio-video source relative to the xR device;
   determining, by the one or more processors, at least one audio or video output for the xR device, based on matching the embedded control message included in the acoustic signal with a control message stored in a memory of the xR device, wherein the control message corresponds to an xR object; and
   in response to the determining, outputting, by the one or more processors, the at least one audio or video output by the xR device, wherein the outputting includes rendering an xR output at the location of the audio-video source based on the control message to the xR device in coordination with a display of the audio-video source.

2. The method of claim 1, further comprising identifying the audio-video source of the acoustic signal.

3. The method of claim 2, further comprising separating the acoustic signal from other sound emitted by the audio-video source.

4. The method of claim 2, further comprising identifying a location of the audio-video source.

5. The method of claim 4, further comprising, coordinating, by the one or more processors, the at least one of audio or video output for the xR device with second audio-video content output by the audio-video source.

6. The method of claim 5, wherein the coordinating is based on at least one of the second audio-video content or the location of the audio-video source.

7. The method of claim 1, wherein the acoustic signal is human-inaudible.

8. The method of claim 1, wherein the acoustic signal has a frequency of no less than 18 Khz.

9. The method of claim 1, wherein the determining further comprises decoding a text message, based on a profile.

10. The method of claim 9, wherein the determining further comprises interpreting the text message.

11. The computer-implemented method of claim 1, wherein the xR object includes one or more multi-dimensional rendering variables.

12. An apparatus for receiving and processing sonic messaging for use in controlling mixed reality (xR) output, the apparatus comprising one or more processors coupled to a memory, an audio input, and an xR output, wherein the memory holds program instructions that when executed by the one or more processors, cause the apparatus to perform:
   detecting, by one or more processors via a microphone of the xR device, an acoustic signal in a digital audio stream from an audio-video source, the acoustic signal including an embedded control message, wherein the embedded control message includes a location of the audio-video source relative to the xR device;

determining, by the one or more processors, at least one audio or video output for the xR device, based on matching the embedded control message included in the acoustic signal with a control message stored in a memory of the xR, wherein the control message corresponds to an xR object; and in response to the determining, outputting, by the one or more processors, the at least one audio or video output by the xR device, wherein the outputting includes rendering an xR output at the location of the audio-video source based on the control message to the xR device in coordination with a display of the audio-video source.

13. The apparatus of claim 12, wherein the memory holds further program instructions for identifying the audio-video source of the acoustic signal.

14. The apparatus of claim 13, wherein the memory holds further program instructions for separating the acoustic signal from other sound emitted by the audio-video source.

15. The apparatus of claim 13, wherein the memory holds further program instructions for identifying a location of the audio-video source.

16. The apparatus of claim 15, wherein the memory holds further program instructions for coordinating the at least one of audio or video output for the xR device with second audio-video content output by the audio-video source.

17. The apparatus of claim 16, wherein the memory holds further program instructions for the coordinating based on at least one of the second audio-video content or the location of the audio-video source.

18. The apparatus of claim 12, wherein the memory holds further program instructions for detecting the acoustic signal having a frequency of no less than 18 Khz.

19. The apparatus of claim 12, wherein the memory holds further program instructions for the determining at least in part by at least one of decoding a text message based on a profile and interpreting the text message.

20. The apparatus of claim 12, wherein the embedded control message is configured for emission at a human inaudible frequency.

* * * * *